(12) United States Patent
Hatano et al.

(10) Patent No.: US 9,575,286 B2
(45) Date of Patent: Feb. 21, 2017

(54) CAMERA MODULE AND TITANIUM-COPPER FOIL

(71) Applicant: JX Nippon Mining & Metals Corporation, Tokyo (JP)

(72) Inventors: Takaaki Hatano, Kanagawa (JP); Masayuki Nagano, Kanagawa (JP); Kenji Koike, Kanagawa (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 111 days.

(21) Appl. No.: 14/435,638

(22) PCT Filed: Jun. 20, 2013

(86) PCT No.: PCT/JP2013/066983
§ 371 (c)(1),
(2) Date: Apr. 14, 2015

(87) PCT Pub. No.: WO2014/064962
PCT Pub. Date: May 1, 2014

(65) Prior Publication Data
US 2015/0338603 A1   Nov. 26, 2015

(30) Foreign Application Priority Data

Oct. 24, 2012  (JP) ................................ 2012-234893
Nov. 16, 2012  (JP) ................................ 2012-252651

(51) Int. Cl.
*G02B 7/02*    (2006.01)
*G02B 7/09*    (2006.01)
(Continued)

(52) U.S. Cl.
CPC . *G02B 7/09* (2013.01); *C22C 9/00* (2013.01); *G02B 7/08* (2013.01); *G03B 3/10* (2013.01); *Y10T 428/12431* (2015.01)

(58) Field of Classification Search
CPC .............. G02B 7/08; G02B 7/09; C22C 9/00; G03B 3/10; Y10T 428/12431
(Continued)

(56) References Cited

U.S. PATENT DOCUMENTS 4,902,359 A *  2/1990  Takeuchi ............. B23K 35/325
                                                                148/222
5,096,508 A *  3/1992  Breedis ..................... C23C 8/80
                                                                148/222

FOREIGN PATENT DOCUMENTS

CN        1991559 A     7/2007
CN     200941127 Y     8/2007
(Continued)

OTHER PUBLICATIONS

English Translation of International Preliminary Report on Patentability (Chapter I), issued Apr. 28, 2015.

*Primary Examiner* — Bumsuk Won
*Assistant Examiner* — Collin X Beatty
(74) *Attorney, Agent, or Firm* — Drinker Biddle & Reath LLP

(57) ABSTRACT

A camera module (1) which includes a lens (3); a spring member (9a, 9b) which elastically urges the lens (3) toward an initial position along an optical axis direction; an electromagnetic drive means (11) capable of driving the lens (3) along the optical axis direction by producing an electromagnetic force against an urging force of the spring member (9a, 9b); and a control means (12) configured to control a drive current supplied to the electromagnetic drive means (11), wherein the spring member (pa, 9b) contains 2.9% to 3.5% by mass of Ti, with the balance being copper and inevitable impurities, and has a Vickers hardness equal to or greater than 350.

16 Claims, 7 Drawing Sheets

(51) Int. Cl.
  *G03B 3/10* (2006.01)
  *C22C 9/00* (2006.01)
  *G02B 7/08* (2006.01)
(58) Field of Classification Search
  USPC .......................................... 359/824, 818, 819
  See application file for complete search history.

(56) References Cited

FOREIGN PATENT DOCUMENTS

| CN | 102465215 A | 5/2012 |
| JP | 2004280031 A | 10/2004 |
| JP | 2009115895 A | 5/2009 |
| JP | 2010007159 A | 1/2010 |
| JP | 2012145652 A | 8/2012 |

\* cited by examiner

CAMERA MODULE AND TITANIUM-COPPER FOIL

TECHNICAL FIELD

The present invention relates to a camera module and titanium-copper foil.

BACKGROUND ART

A technique to perform an automatic focusing operation by moving a lens by an electromagnetic force acting against an urging force of a spring member is known as a lens drive method for a camera module incorporated in a small electronic appliance such as a portable telephone (see, for example, Patent Literatures 1 and 2).

A camera module using this kind of lens drive method is provided with a spring member such as a compression coil spring or a plate spring which elastically urges a lens toward an initial position along an optical axis direction, electromagnetic drive means capable of driving the lens along the optical axis direction by producing an electromagnetic force against the urging force of the spring member, the electromagnetic drive means including a coil and a magnet, and control means which moves the lens to a predetermined position by controlling a drive current supplied to the electromagnetic drive means. The principle of the operation of the camera module will be briefly described. When the coil in the electromagnetic drive means is not energized, the spring member holds the lens at the initial position. When the drive current is supplied from a power supply to the coil in the electromagnetic drive means, an electromagnetic force against the urging force of the spring member is produced and the coil moves along the optical axis direction integrally with the lens. Thus, an automatic focusing operation to move the lens to a desired position on the optical axis can be performed by the control means controlling the magnitude of the drive current.

CITATION LIST

Patent Literature

[Patent Literature 1] Japanese Patent Laid-Open No. 2004-280031
[Patent Literature 2] Japanese Patent Laid-Open No. 2009-115895

SUMMARY OF INVENTION

Problem to be Solved by the Present Invention

When a strong impact is applied along the optical axis direction to the camera module using the above-described lens drive method while the spring member holding the lens is in a state of being largely deformed elastically, there is a significant risk of the spring member deforming by exceeding the proportional limit of its elasticity and becoming unable to return to the original state. That is, when a user of a small electronic appliance such as a portable telephone incorporating a camera module of this kind accidentally drops the electronic appliance, there is a possibility of the spring member being excessively deformed by an impact due to the drop by exceeding the proportional limit of its elasticity, if the lens of the camera module has been moved to a position largely distanced from the initial position. The spring member exceeding the proportional limit is permanently set. Thereafter, it may be difficult to normally perform the automatic focusing operation with the spring member.

The present invention has been achieved in consideration of the above-described situations of the related art, and an object of the present invention is to provide a camera module and a titanium-copper foil capable of limiting a permanent set of a spring member and reducing the possibility of occurrence of a malfunction when an impact of a fall for example is exerted.

Means for Solving the Problem

To achieve the above-described object, the inventor of the present invention has studied an application of titanium-copper foil to a spring member of a camera module. Titanium copper has been put to practical use, for example, as C1990 (a JIS registered alloy, 3.2% by mass of Ti-balance Cu) and NKT322 (an alloy developed by JX Nippon Mining & Metals, 3.2% by mass of Ti-0.2% by mass of Fe-balance Cu), has a high bearing capacity and a good stress relaxation characteristic, and is, therefore, known as one of materials most resistant to permanent setting among copper alloys. The inventor of the present invention has found that a permanent-set characteristic of a titanium copper foil can be improved by controlling the Vickers hardness of the titanium copper foil or the composition of a polar surface of the titanium copper foil in a proper range to enable favorable use of the titanium copper foil as a spring member of the camera module.

According to one aspect of the present invention completed on the basis of the above finding, there is provided a camera module including a lens, a spring member which elastically urges the lens toward an initial position along an optical axis direction, electromagnetic drive means capable of driving the lens along the optical axis direction by producing an electromagnetic force against the urging force of the spring member, and control means which controls a drive current supplied to the electromagnetic drive means, wherein the spring member contains 2.9% to 3.5% by mass of Ti, with the balance being copper and inevitable impurities, and has a Vickers hardness equal to or higher than 350 and a thickness equal to or greater than 0.01 mm and less than 0.1 mm.

According to another aspect of the present invention, there is provided a camera module including a lens, a spring member which elastically urges the lens toward an initial position along an optical axis direction, electromagnetic drive means capable of driving the lens along the optical axis direction by producing an electromagnetic force against the urging force of the spring member, and control means which controls a drive current supplied to the electromagnetic drive means, wherein the spring member contains 2.9% to 3.5% by mass of Ti, with the balance being copper and inevitable impurities, the Ti concentration at a depth of 0.1 µm from the surface being at least 0.6 times a Ti concentration at a depth of 1 µm from the surface, the thickness of the spring member being equal to or greater than 0.01 mm and less than 0.1 mm.

According to yet another aspect of the present invention, there is provided a camera module including a lens, a spring member which elastically urges the lens toward an initial position along an optical axis direction, electromagnetic drive means capable of driving the lens along the optical axis direction by producing an electromagnetic force against the urging force of the spring member, and control means which controls a drive current supplied to the electromagnetic drive means, wherein the spring member contains 2.9% to 3.5% by mass of Ti, with the balance being copper and inevitable impurities, and has a Vickers hardness equal to or higher than 350, the Ti concentration at a depth of 0.1 µm from the surface being at least 0.6 times a Ti concentration at a depth of 1 µm from the surface, the thickness of the spring member being equal to or greater than 0.01 mm and less than 0.1 mm.

According to still another aspect of the present invention, there is provided a camera module which performs an automatic focusing operation by moving a lens by an electromagnetic force against the urging force of a spring member, wherein the spring member contains 2.9% to 3.5% by mass of Ti, with the balance being copper and inevitable impurities, and has a Vickers hardness equal to or higher than 350 and a thickness equal to or greater than 0.01 mm and less than 0.1 mm.

According to a further aspect of the present invention, there is provided a camera module which performs an automatic focusing operation by moving a lens by an electromagnetic force against the urging force of a spring member, wherein the spring member contains 2.9% to 3.5% by mass of Ti, with the balance being copper and inevitable impurities, the Ti concentration at a depth of 0.1 µm from the surface being at least 0.6 times a Ti concentration at a depth of 1 µm from the surface, the thickness of the spring member being equal to or greater than 0.01 mm and less than 0.1 mm.

According to a still further aspect of the present invention, there is provided a camera module which performs an automatic focusing operation by moving a lens by an electromagnetic force against the urging force of a spring member, wherein the spring member contains 2.9% to 3.5% by mass of Ti, with the balance being copper and inevitable impurities, and has a Vickers hardness equal to or higher than 350, the Ti concentration at a depth of 0.1 µm from the surface being at least 0.6 times a Ti concentration at a depth of 1 µm from the surface, the thickness of the spring member being equal to or greater than 0.01 mm and less than 0.1 mm.

In another mode of the camera module according to the present invention, the spring member further contains 0.17 to 0.23% by mass of Fe.

According to a still further aspect of the present invention, there is provided a titanium-copper foil containing 2.9% to 3.5% by mass of Ti, with the balance being copper and inevitable impurities, the titanium-copper foil having a Vickers hardness equal to or higher than 350 and a thickness equal to or greater than 0.01 mm and less than 0.1 mm.

According to a still further aspect of the present invention, there is provided a titanium-copper foil containing 2.9% to 3.5% by mass of Ti, with the balance being copper and inevitable impurities, the Ti concentration at a depth of 0.1 µm from the surface being at least 0.6 times a Ti concentration at a depth of 1 µm from the surface, the thickness of the titanium-copper foil being equal to or greater than 0.01 mm and less than 0.1 mm.

According to a still further aspect of the present invention, there is provided a titanium-copper foil containing 2.9% to 3.5% by mass of Ti, with the balance being copper and inevitable impurities, the titanium-copper foil having a Vickers hardness equal to or higher than 350, the Ti concentration at a depth of 0.1 µm from the surface being at least 0.6 times a Ti concentration at a depth of 1 µm from the surface, the thickness of the titanium-copper foil being equal to or greater than 0.01 mm and less than 0.1 mm.

In a mode of the titanium-copper foil according to the present invention, the titanium-copper foil further contains 0.17% to 0.23% by mass of Fe.

According to the present invention, a camera module and a titanium-copper foil capable of limiting a permanent set of a spring member and reducing the possibility of occurrence of a malfunction when an impact of a fall for example is exerted.

DETAILED DESCRIPTION OF THE EMBODIMENTS

-Camera Module-

An embodiment of the present invention will be described with reference to the accompanying drawings. It is to be noted that the drawings referred to below are schematic and the relationship between a thickness and an average size, the proportion of each layer, etc., are different from their realities. Needless to say, the drawings may include portions varying relative to each other in terms of size relationship or proportion. In this specification, terms "upper", "upward", "lower" and "downward" are used for ease of description as occasion demands. These terms designate top-bottom relationships as viewed in FIG. 1 or 3. "Upper" or "upward" signifies a positional relationship in a direction from a camera toward an object.

Figure 1:
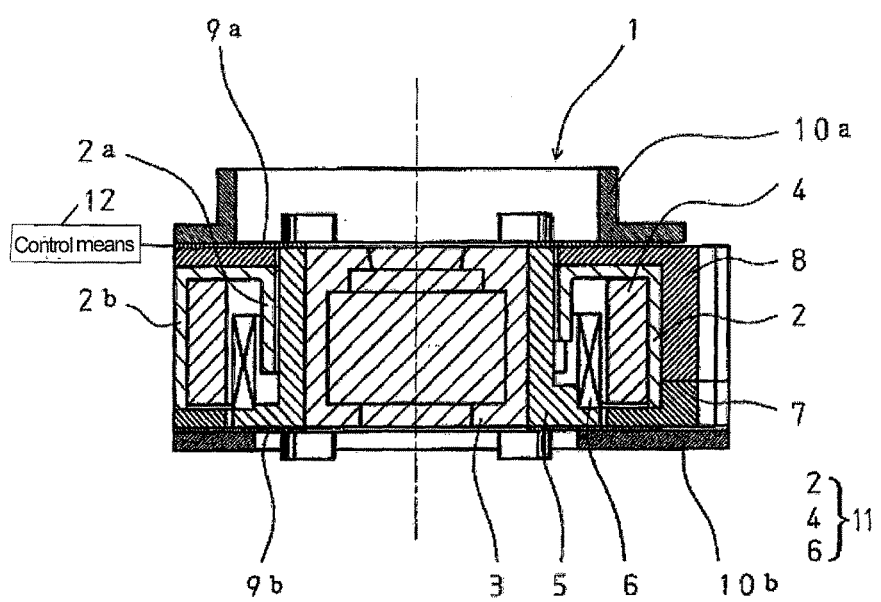
FIG. 1 is a sectional view showing an example of a camera module according to an embodiment of the present invention.

A camera module 1 according to an embodiment of the present invention has, as illustrated in FIG. 1, a lens 3, spring members 9a and 9b which elastically urge the lens 3 toward an initial position along an optical axis direction, electromagnetic drive means 11 (a yoke 2, a magnet 4 and a coil 6) capable of driving the lens 3 along the optical axis direction by producing an electromagnetic force against the urging force of the spring members 9a and 9b, and control means 12 configured to control a drive current supplied to the electromagnetic drive means 11.

Figure 2:
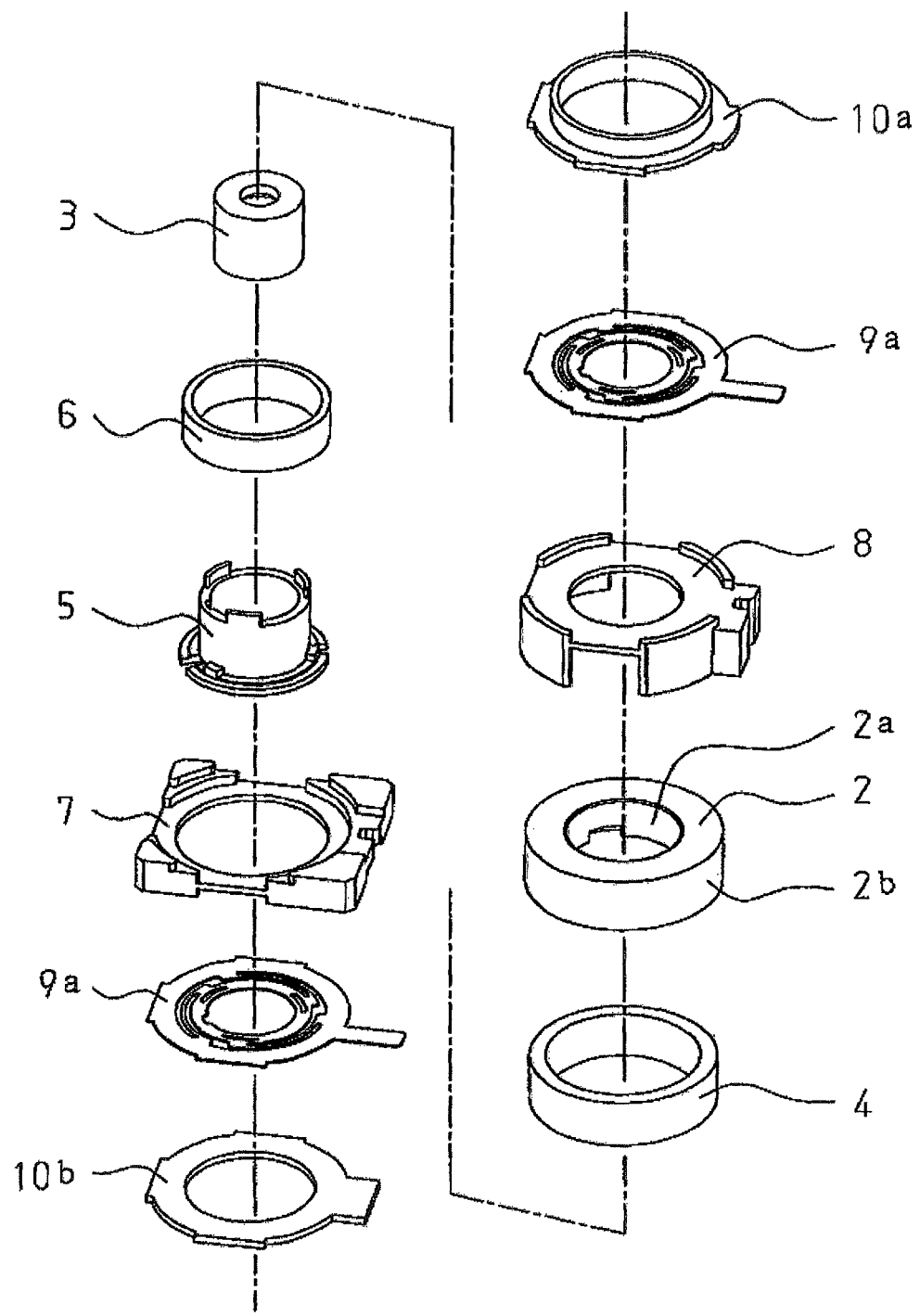
FIG. 2 is an exploded perspective view of the camera module shown in FIG. 1.

The lens 3 is housed in a carrier 5. The carrier 5 is a mold of a cylindrical structure having a bottom surface as shown in FIG. 2 and formed of a synthetic resin for example. The carrier 5 holds the lens 3 in a central position. A coil 6 formed in advance is bonded to a peripheral surface of the carrier 5. A magnet 4 is disposed in an outer position relative to the coil 6. The magnet 4 is magnetized in a diametric direction.

As shown in FIG. 1, the magnet 4 is housed in the yoke 2. The yoke 2 is a magnetic material such as a soft iron formed into a cylindrical shape having a generally U-shaped section and closed at its top. The yoke 2 has a cylindrical inner wall 2a and a cylindrical outer wall 2b. The magnet 4 and the coil 6 are disposed in a space provided between the inner wall 2a and the outer wall 2b. The yoke 2 is mounted on a base 7 formed of a resin mold or the like. The coil 6, the magnet 4 and the yoke 2 function as electromagnetic drive means 11 for the camera module 1. That is, when the coil 6 is supplied with a drive current, a predetermined electromagnetic force against the urging force of the spring members 9a and 9b is produced by means of the magnet 4 and the yoke 2.

A frame 8 disposed so as to cover the yoke 2 and formed of a resin mold or the like is disposed on the base 7. A cap 10b is attached to a bottom surface of the base 7. A cap 10a is attached to an upper portion of the frame 8.

The spring members 9a and 9b are identical to each other, supports the carrier 5 by abutting on opposite ends of the carrier 5 in the same positional relationship with the carrier 5, and function as current feed paths to the coil 6. Each of the spring members 9a and 9b has an outward projection at one position on its periphery, the outward projection functioning as a current feed terminal. A lead from one end of the coil 6 extends upward by passing through a groove provided in an inner peripheral surface of the carrier 5 and is soldered to the spring member 9a. A lead from the other end of the coil 6 extends downward by passing through a groove provided in a bottom surface of the carrier 5 and is soldered to the spring member 9b. The spring member 9a is fixed to a bottom portion of the carrier 5 and to the base 7, and the spring member 9b is fixed to an uppermost portion of the carrier 5 and on the frame 8.

Each of the spring members 9a and 9b has its outermost peripheral portion fixed to the frame 8 and to the base 7 and has cut recesses provided at in its inner peripheral portion at intervals of 120° and fitted to the carrier 5 and fixed to the same by heat caulking for example. Fixing of the spring member 9b to the base member 7 and fixing of the spring member 9a to the frame 8 are performed by bonding and heat caulking for example.

As described above, since the spring members 9a and 9b are identical in shape to each other and attached in the same positional relationship as shown in FIGS. 1 and 2, axial deviation can be limited when the carrier 5 is moved upward. The coil 6 is made by being pressure-formed after being wound. Therefore the coil 6 is capable of improving the accuracy of the finished outside diameter and can easily be disposed in a predetermined narrow gap. The carrier 5 abuts on the base 7 at its lowest position and abuts on the yoke 2 at its highest position. A top-bottom abutment mechanism is thus provided to prevent the carrier 5 from coming off.

As a raw workpiece for the spring members 9a and 9b, a plate spring formed of improved titanium-copper foil is used. This titanium-copper foil is characterized by containing 2.9% to 3.5% by mass of Ti and, if necessary, 0.17% to 0.23% by mass of Fe, with the balance being copper and inevitable impurities, and by having a Vickers hardness equal to or greater than 350, or having the Ti concentration at a depth of 0.1 μm from the titanium-copper foil surface set to a value at least 0.6 times the Ti concentration at a depth of 1 μm from the surface. A permanent-set characteristic of the spring members 9a and 9b is improved thereby. As a result, a malfunction is not easily caused even when an impact of a fall for example is exerted on the spring members 9a and 9b.

The control means 12 is electrically connected to the coil 6 connected to the spring members 9a and 9b and is also connected electrically to electric power supply means not illustrated. The control means 12 controls energization of the coil 6 and controls the magnitude of drive current supplied to the coil 6.

Figure 3:
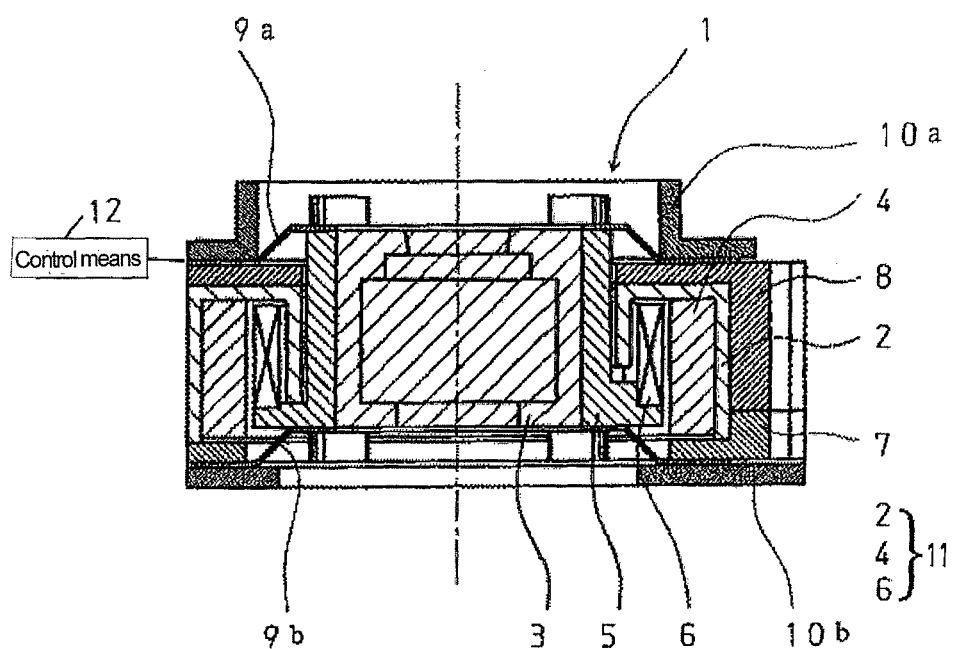
FIG. 3 is a sectional view showing the example of the operation of the camera module shown in FIG. 1.

FIG. 3 shows a sectional view when a current is applied to the coil 6 to produce an electromagnetic force and to thereby move upward the carrier 5 with the lens 3. When a predetermined drive current is supplied from the power supply to the feed terminal of the spring member 9a or 9b, the current flows through the coil 6 connected to the feed terminal to exert an electromagnetic force on the carrier 5 in an upward direction as viewed in FIG. 3. On the other hand, the restitutive force (urging force toward the initial position) of the linked two spring members 9a and 9b acts on the carrier 5 in a downward direction. The carrier 5 is moved upward to a position where the electromagnetic force and the restitutive force are balanced. The amount of movement of the carrier 5 is determined by the magnitude of the drive current applied to the coil 6.

At this time, the restitutive fore acts downward evenly between the upper and lower surfaces of the carrier 5 since the spring members 9a and 9b support the upper and lower surfaces, respectively, of the carrier 5, thereby enabling limiting of axial deviation of the lens 3.

Therefore, there is no need to guide, with ribs or the like, the carrier 5 during the upward movement of the carrier 5. Since there is no slide friction with a guide, the balance between the electromagnetic force and the restitutive force purely dominates the amount of movement of the carrier 5, thereby realizing smooth and accurate movement of the lens 3. Automatic focusing with reduced lens shake is achieved thereby.

While the description has been made by assuming that the magnet 4 is cylindrical, the described magnet 4 is not exclusively used. The magnet 4 may be divided into three or four pieces, radially magnetized and fixed by being attached to the inner surface of the outer wall 2b of the yoke 2.

The present invention is not limited to the construction of the camera module 1 shown in FIGS. 1 to 3. The titanium-copper foil and the spring member according to the embodiment of the present invention can, of course, be applied as a spring member in a common camera module capable of performing an automatic focusing operation by moving the lens by an electromagnetic force acting against the urging force of a spring member. Needless to say, the present invention comprises various embodiments other than the one described in this specification and is implemented by being variously modified as long as it does not depart from its gist.

-Titanium-Copper Foil-

The titanium-copper foil according to the present invention will be described in detail.

(Alloy Components)

The Ti concentration is set to 2.9% to 3.5% by mass. Ti for titanium copper is solid-solved in a Cu matrix by solution annealing and a fine-grained precipitate is dispersed on the alloy by an aging treatment to improve the titanium copper in strength and electrical conductivity. If the Ti concentration is lower than 2.9% by mass, the precipitate is not sufficiently precipitated and the desired strength cannot be obtained. If the Ti concentration exceeds 3.5% by mass, the bendability is reduced. To further improve the strength, 0.17% to 0.23% by mass of Fe may be contained.

A typical titanium-copper alloy C1990 has a chemical composition standardized in JIS H 3130 (2006) to have a Ti content of 2.9% to 3.5% by mass and a Cu+Ti content of 99.5% or more by mass while being allowed to have an impurity content not higher than 0.5% by mass. Examples of impurities in titanium copper are a residue (e.g., Al, Si, B, or P) of a deoxidizer added to the molten metal, mixing (of Al, Si, C, B, Na, Zr, or Cr, for example) from the furnace wall of the melting furnace or a molten metal covering material, an impurity (e.g., Ag) contained at a comparatively high concentration in electrolytic copper, which is a chief raw material, mixing (of S, for example) from a scrap raw material, and mixing (of O and N, for example) from atmospheric gas. From the viewpoint of enabling enhancement of the effects of the present invention, it is preferable that the total amount of impurities be 0.1% by mass. More preferably, the total amount of impurities is equal to or less than 0.05% by mass. Further preferably, the total amount of impurities is equal to or less than 0.01% by mass.

(Hardness)

If the hardness is increased, the proportional limit is increased and the possibility of occurrence of a permanent set is reduced. If the Vickers hardness is equal to or greater than 350, a marked improvement in terms of prevention of a malfunction resulting from a fall impact is achieved when the titanium-copper foil is used as the spring member of the camera module. No upper limit of the Vickers hardness is not set from the viewpoint of a fall impact resistance characteristic. The Vickers hardness of the titanium-copper foil, however, rarely exceeds 500.

(Surface Composition)

Ti oxidizes much easier than Cu. Therefore, when a heat treatment such as solution annealing is performed in the process of producing the foil, oxidized scale containing Ti at a high concentration is generated in the material surface, thereby forming right below the oxidized scale a portion in which the Ti concentration is lower than that in the base material (hereinafter referred to as "Ti-deficient layer"). This is because Ti in the base material diffuses (moves) to the oxidized scale side during the growth of the high-Ti oxidized scale. Thereafter, when the oxidized scale is removed by acid cleaning or mechanical polishing, the Ti-deficient layer is exposed in the foil surface.

The strength (proportional limit) of the Ti-deficient layer is lower than that of the portion having the Ti concentration not changed. Since the Ti-deficient layer is extremely thin, its influence on the material characteristics is hard to detect by a tensile test or a hardness test but may appear as a permanent set when bending stress is caused therein. Under bending deformation, the maximum stress occurs in the material surface. Therefore, the permanent-set characteristic due to bending is easily influenced by the strength of the material surface portion. Also, if the thickness of the material is reduced, the influence of the Ti-deficient layer on the permanent-set characteristic is increased.

If the Ti concentration at a depth of 0.1 µm from the surface is adjusted to at least 0.6 times, more preferably at least 0.8 times the Ti concentration at a depth of 1 µm from the surface, the possibility of occurrence of a permanent set is reduced and a marked improvement in terms of prevention of a malfunction resulting from a fall impact is significantly achieved.

Figure 4:
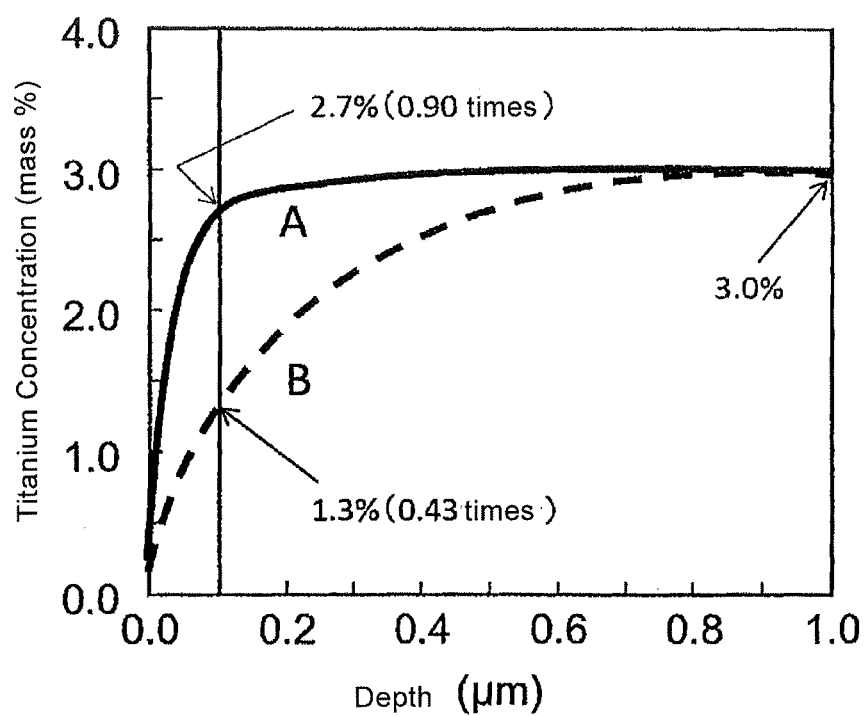
FIG. 4 is a graph showing changes in Ti concentration with respect to the depth direction in the titanium-copper foil according to the embodiment of the present invention (solid line) and a conventional titanium-copper foil (dotted line).

FIG. 4 shows changes in Ti concentration with respect to the depth direction obtained by performing composition analysis using a glow discharge emission spectroscopic analysis method (GDS) on the surfaces of the titanium-copper foil according to the embodiment of the present invention (the present invention item) and a conventional titanium-copper foil (conventional item) while gradually removing part of the titanium-copper foil from the surface by Ar sputtering. A specimen A (solid line in FIG. 4) corresponds to the present invention item and a specimen B (broken line in FIG. 4) corresponds to the conventional item. A position defined at a depth of 1 µm from the surface is a position at which no change in Ti concentration occurred. With reference to the Ti concentration at this position, the Ti concentration at a position of 0.1 µm from the surface is evaluated. If the Ti concentration is reduced (not converged) even at a position of 1 µm from the surface, the Ti concentration at a position defined at a deeper depth may be used as a reference.

(Thickness of Foil)

When the thickness of the titanium copper foil is equal to or greater than 0.1 mm, the urging force of the spring members 9a and 9b is excessively large and the electromagnetic force required for lens drive is also increased. As a result, for example, a problem that the camera module is increased in size or the lens drive accuracy is reduced arises.

Also, an effect of improving the permanent set characteristic when the titanium-copper foil is used as a plate spring, which is achieved by controlling the surface composition, appears when the foil thickness is less than 0.1 mm. With reduction in foil thickness, this effect is significantly enhanced. Similarly, an effect of improving the permanent set characteristic when the automatic focusing module receives a fall impact, which is achieved by controlling the surface composition of the titanium-copper foil used as spring members 9a and 9b, appears when the foil thickness is less than 0.1 mm. With reduction in foil thickness, this effect is significantly enhanced.

Accordingly, the thickness of the titanium-copper foil is set less than 0.1 mm, preferably equal to or less than 0.08 mm, more preferably equal to or less than 0.05 mm.

On the other hand, if the thickness of the titanium-copper foil is less than 0.01 mm, the spring force of the spring member is not sufficiently large. When the titanium-copper foil is used as spring members 9a and 9b of the automatic focusing module in particular, there is a need to cause a larger deformation in each spring member in order to obtain the desired urging force. If such a deformation is given, a permanent set can occur easily in the spring member when the spring member receives a fall impact, resulting in a malfunction of the automatic focusing module. The thickness of the titanium-copper foil according to the present invention is therefore set equal to or greater than 0.01 mm, preferably equal to or greater than 0.02 mm.

(Production Method)

In an ordinary process of producing the titanium copper foil, raw materials including electrolytic copper and Ti are first molten in a melting furnace to obtain molten metal of the desired composition. This molten metal is cast into an ingot. It is preferable to perform melting and casting in a vacuum or in an inert gas atmosphere in order to prevent oxidation wastage of titanium. Thereafter, the material is finished into a foil having the desired thickness and characteristics in the order shown below.

(1) Hot rolling (at a temperature of 800 to 1000° C., to a thickness of about 5 to 20 mm)
(2) Facing (removal of oxidized scale)
(3) Cold rolling
(4) solution annealing (at 750 to 900° C. for 5 to 300 seconds by water cooling)
(5) Polishing
(6) Cold rolling
(7) Aging treatment (at 350 to 550° C. for 2 to 20 hours)
(8) Polishing
(9) Cold rolling

(10) Destressing annealing (at 300 to 600° C. for 5 seconds to 10 hours)
(11) Polishing Hot rolling (1) can be performed under ordinary conditions for titanium copper. By solution annealing (4), coarse Cu—Ti compound particles crystallized or precipitated at the time of casting or hot rolling are molten into the Cu base material. By aging treatment (7), fine particles of $Cu_3Ti$ or $Cu_4Ti$ are precipitated. The strength of the alloy is increased by this fine precipitate material.

Cold rollings (6) and (9) are performed for the purpose of strengthening. For adjustment of the Vickers hardness to a value equal to or higher than 350, it is preferable to set the total rolling reduction ratio (r) of cold rolling (6) and cold rolling (9) equal to or higher than 90%. However, if r exceeds 99.5%, the workability of the material is reduced and there is a possibility of the material breaking at the time of rolling. In this embodiment, r is defined by the following equation:

$$r(\%)=(t_0-t)/t_0 \times 100$$

($t_0$: the thickness after polishing (5), t: the thickness after cold rolling (9))

Destressing annealing (10) is performed at one's choice for the purpose of restoring, for example, the spring bending elastic limit reduced by cold rolling (9) in a case where cold rolling (9) is performed.

Polishings (5), (8), and (11) are performed for the purpose of removing oxidized scale produced in heat treatments (4), (7), and (11). As each polishing, chemical polishing or mechanical polishing may be performed. Both chemical polishing and mechanical polishing may be performed in combination. A sulfuric acid-hydrogen peroxide solution, a ferric chloride solution, a cupric chloride solution or a nitric acid solution for example is used as a chemical polishing solution. A typical example of mechanical polishing is buffing using a rotary buff having abrasive gains embedded therein.

Surface oxidation of the material in solution annealing (4) is the strongest of those in heat treatments (4), (7), and (11). This is because the treatment temperature therein is the highest. It is, therefore, important to limit the surface oxidation in solution annealing (4) in increasing the Ti concentration at a depth of 0.1 µm from the surface. For example, reducing the oxygen concentration in the heating furnace is effective in doing so. The Ti concentration at a depth of 0.1 µm from the surface can also be increased by increasing the amount of material removed from the surface by polishing (5).

(Use)

The titanium copper according to the present invention can also be used favorably as a spring member in various parts other than those in the camera module by utilizing its hard-to-permanently-set characteristic. Such parts are, for example, electrical components including a connector, a terminal, a socket and a relay.

EXAMPLES

Examples of the present invention will be described below. The examples described below are provided to enable better understanding of the present invention and the advantages of the present invention and are not intended to limit the present invention.

Alloys having compositions in accordance with C1990 and NKT322 were produced as experimental materials (examples) (which alloys according to the present embodiment hereinafter referred to as C1990 and NKT322) and the influences of the hardness, the surface composition and the foil thickness on the fall impact resistance of the camera module were examined. C1990 is an alloy registered in JIS H 3130 (2006), containing 2.9% to 3.5% by mass (typical value: 3.2% by mass) of Ti, with the balance being copper and inevitable impurities. NKT322 is an alloy developed by JX Nippon Mining & Metals, containing 2.9% to 3.4% by mass (typical value: 3.2% by mass) of Ti and 0.17 to 0.23% by mass (typical value: 0.2% by mass) of Fe, with the balance being copper and inevitable impurities.

Electrolytic copper was molten in a vacuum melting furnace, alloy elements were added, and an ingot in rectangular block form having a thickness of 150 mm and a width of 500 mm was thereafter produced by semicontinuous casting. Hot rolling of this ingot was performed by heating the ingot at 950° C. for 3 hours and thereafter rolling the ingot to 10 mm. Surface facing was subsequently performed to remove oxidized scale in the surface of the hot-rolled plate. The thickness of the material after facing was 8 mm. Cold rolling and heat treatment were performed in subsequent process steps. Foils having thicknesses of 0.052 mm and 0.028 mm were thus produced.

(1) Cold rolling 1: Cold rolling was performed to a predetermined thickness according to a target foil thickness and a target Vickers hardness.
(2) Solution annealing: Heating was performed at 800° C. for 10 to 300 seconds. The heating time was adjusted so that the average diameter of recrystallized grains after annealing was in the range from 5 to 20 µm. Further, the thickness of oxidized scale in the material surface and the Ti concentration and the thickness of the Ti-deficient layer immediately below the oxidized scale were adjusted by changing the heating atmosphere from one to another of the atmospheric air, Ar and CO.
(3) Polishing 1: Chemical polishing was performed with a sulfuric acid-hydrogen peroxide solution and mechanical polishing was thereafter performed with a rotary buff, thereby removing the oxidized scale in the surface and a base portion immediately below the oxidized scale. At this time, the surface polishing depth was variously changed in the range from 0.3 to 1.0 µm according to the concentration of a sulfuric acid-hydrogen peroxide solution and each polishing time.
(4) Cold rolling 2: Cold rolling was performed to a predetermined thickness according to the target foil thickness and Vickers hardness.
(5) Aging treatment: Heating was performed at 450° C. for 5 hours in an Ar atmosphere.
(6) Polishing 2: Chemical polishing was performed with a sulfuric acid-hydrogen peroxide solution and mechanical polishing was thereafter performed with a rotary buff, thereby removing the oxidized scale in the surface. The surface polishing depth was about 0.02 µm.
(7) Cold rolling 3: Rolling to the target foil thickness was performed.

The above-described GDS analysis was performed on the surface of the foil specimen subjected to cold rolling (7) to measure the Ti concentration ($[\%Ti]_{0.1}$) at a depth of 0.1 µm from the surface and the Ti concentration ($[\%Ti]_1$) at a depth of 1 µm from the surface, and a titanium concentration ratio ($R_{Ti}$) defined by an equation shown below was obtained.

$$R_{Ti}=[\%Ti]_{0.1}/[\%Ti]_1$$

The specimen A in FIG. 4 is C1990 produced under conditions: a thickness of 0.028 mm, a total rolling reduction ratio (r) of 98%, solution annealing performed by heating in a CO atmosphere for 30 seconds, and polishing 1 to 0.5 μm, and having $R_{Ti}$=0.90. The specimen B in FIG. 4 is C1990 produced under conditions: a thickness of 0.028 mm, a total rolling reduction ratio (r) of 98%, solution annealing performed by heating in the atmospheric air for 30 seconds, and polishing 1 to 0.5 μm, and having $R_{Ti}$=0.43.

Figure 5:
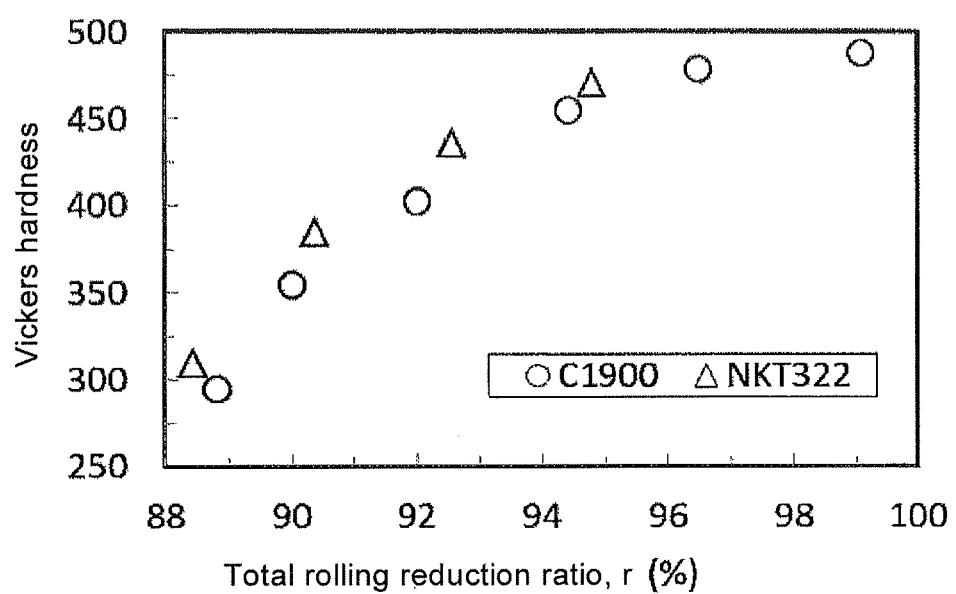
FIG. 5 is a graph showing the relationship between the total rolling reduction ratio (r) and the Vickers hardness of the spring member suitable for the cameral module according to the embodiment of the present invention.

Micro Vickers hardness was measured in accordance with JIS Z2244. FIG. 5 shows the relationship between the total rolling reduction ratio (r) and the Vickers hardness. Vickers hardnesses equal to or higher than 350 were obtained with stability when R was equal to or higher than 90%.

Next, spring members 9a and 9b were made by using the foil specimen subjected to the cold rolling, and camera modules 1 of the structure shown in FIGS. 1 to 3 were built. With respect to the specimens having the same foil thickness, the same camera module structure was formed. The current value ($I_{Bmin}$) when the carrier 5 starts moving and the current value ($I_{Bmax}$) when the amount of movement of the carrier 5 is maximized were obtained. Next, the camera module was caused to fall from a height of 2 m to a floor surface and the current value ($I_{Amin}$) when the carrier 5 starts moving was measured with respect to the camera module after falling. From these measured values, a P value was obtained by the following equation:

$$P(\%)=|(I_{Bmin}-I_{Amin})/I_{Bmax}|\times 100$$

The P value is a value obtained by dividing a change (absolute value) in the movement-start current accompanying a fall by the maximum movement current. It can be said that if the P value is smaller, the operation stability with respect to a fall impact is higher.

Figure 6:
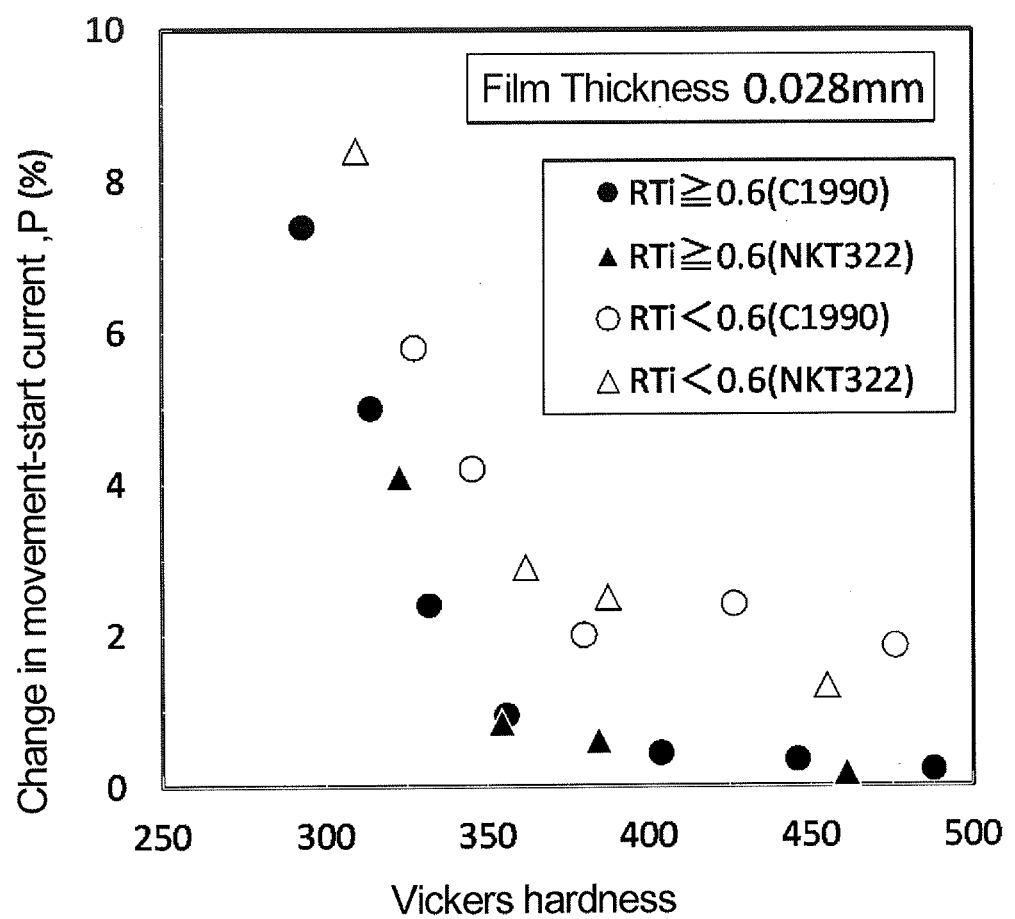
FIG. 6 is a graph showing the relationship between the Vickers hardness and the P value when the film thickness of the spring member according to the embodiment of the present invention is set to 0.028 mm.
Figure 7:
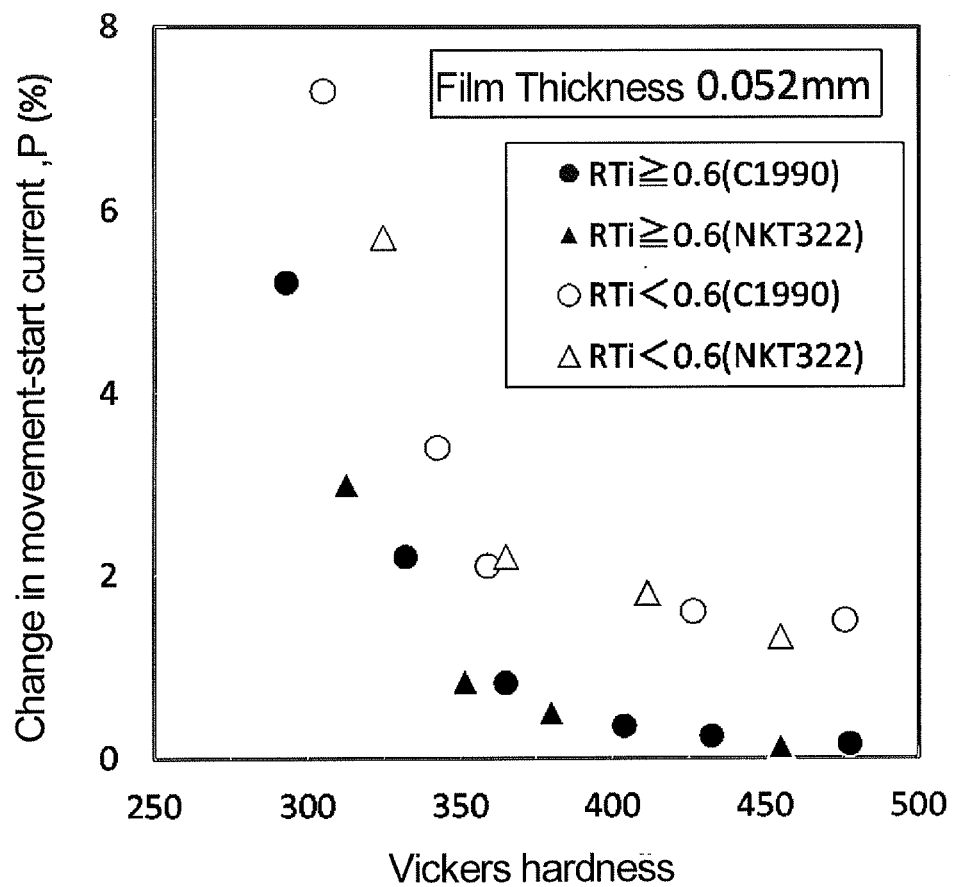
FIG. 7 is a graph showing the relationship between the Vickers hardness and the P value when the film thickness of the spring member according to the embodiment of the present invention is set to 0.052 mm.

Each of FIGS. 6 and 7 shows the relationship between the Vickers hardness and the P value when the film thickness is 0.028 mm or 0.052 mm. It can be understood that when the Vickers hardness is equal to or higher than 350, and when the $R_{Ti}$ value is equal to or higher than 0.6, the P value is reduced, that is, a marked improvement in terms of prevention of a malfunction resulting from a fall impact is achieved.

What is claimed is:

1. A camera module comprising:
   a lens;
   a spring member which elastically urges the lens toward an initial position along an optical axis direction;
   an electromagnetic drive means capable of driving the lens along the optical axis direction by producing an electromagnetic force against an urging force of the spring member; and
   a control means configured to control a drive current supplied to the electromagnetic drive means,
   wherein the spring member contains 2.9% to 3.5% by mass of Ti, with the balance being copper and inevitable impurities, and has a Vickers hardness equal to or greater than 350 and a thickness equal to or greater than 0.01 mm and less than 0.1 mm.

2. A camera module comprising:
   a lens;
   a spring member which elastically urges the lens toward an initial position along an optical axis direction;
   an electromagnetic drive means capable of driving the lens along the optical axis direction by producing an electromagnetic force against an urging force of the spring member; and
   a control means configured to control a drive current supplied to the electromagnetic drive means,
   wherein the spring member contains 2.9% to 3.5% by mass of Ti, with the balance being copper and inevitable impurities, the Ti concentration at a depth of 0.1 μm from the surface being at least 0.6 times a Ti concentration at a depth of 1 μm from the surface, the thickness of the spring member being equal to or greater than 0.01 mm and less than 0.1 mm.

3. The camera module of claim 1, wherein
   the spring member has a Ti concentration at a depth of 0.1 μm from the surface being at least 0.6 times a Ti concentration at a depth of 1 μm from the surface.

4. The camera module of claim 1, wherein the camera module performs an automatic focusing operation by moving the lens by the electromagnetic force against an urging force of the spring member.

5. The camera module of claim 4, wherein the spring member has a Ti concentration at a depth of 0.1 μm from the surface being at least 0.6 times a Ti concentration at a depth of 1 μm from the surface.

6. The camera module according to claim 1, wherein the spring member further contains 0.17% to 0.23% by mass of Fe.

7. A titanium-copper foil containing 2.9% to 3.5% by mass of Ti, with the balance being copper and inevitable impurities, the titanium-copper foil having a Vickers hardness equal to or higher than 350 and a thickness equal to or greater than 0.01 mm and less than 0.1 mm.

8. A titanium-copper foil containing 2.9% to 3.5% by mass of Ti, with the balance being copper and inevitable impurities, the Ti concentration at a depth of 0.1 μm from the surface being at least 0.6 times a Ti concentration at a depth of 1 μm from the surface, the thickness of the titanium-copper foil being equal to or greater than 0.01 mm and less than 0.1 mm.

9. The titanium-copper foil of claim 7, wherein the titanium-copper foil has a Ti concentration at a depth of 0.1 μm from the surface being at least 0.6 times a Ti concentration at a depth of 1 μm from the surface.

10. The titanium-copper foil according to claim 7, wherein the titanium-copper foil further contains 0.17 to 0.23% by mass of Fe.

11. The camera module according to claim 2, wherein the spring member further contains 0.17% to 0.23% by mass of Fe.

12. The camera module according to claim 3, wherein the spring member further contains 0.17% to 0.23% by mass of Fe.

13. The camera module according to claim 4, wherein the spring member further contains 0.17% to 0.23% by mass of Fe.

14. The camera module according to claim 5, wherein the spring member further contains 0.17% to 0.23% by mass of Fe.

15. The titanium-copper foil according to claim 8, wherein the titanium-copper foil further contains 0.17 to 0.23% by mass of Fe.

16. The titanium-copper foil according to claim 9, wherein the titanium-copper foil further contains 0.17 to 0.23% by mass of Fe.

* * * * *